United States Patent
Zeng et al.

(10) Patent No.: US 11,119,187 B2
(45) Date of Patent: Sep. 14, 2021

(54) RESOLUTION OF DOPPLER AMBIGUITY IN A RADAR SYSTEM THROUGH TRACKING

(71) Applicant: GM Global Technology Operations LLC, Detroit, MI (US)

(72) Inventors: Shuqing Zeng, Sterling Heights, MI (US); Igal Bilik, Rehovot (IL); Yasen Hu, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 334 days.

(21) Appl. No.: 16/279,286

(22) Filed: Feb. 19, 2019

(65) Prior Publication Data
US 2020/0264274 A1     Aug. 20, 2020

(51) Int. Cl.
G01S 13/58     (2006.01)
G01S 7/35      (2006.01)

(52) U.S. Cl.
CPC ............ G01S 7/354 (2013.01); G01S 13/584 (2013.01)

(58) Field of Classification Search
CPC .... G01S 13/343; G01S 13/584; G01S 13/726; G01S 13/931; G01S 7/354
See application file for complete search history.

(56) References Cited

U.S. PATENT DOCUMENTS

2009/0243920 A1* 10/2009 Anand .................... G01S 19/42
                                                      342/357.29

* cited by examiner

*Primary Examiner* — Timothy A Brainard
(74) *Attorney, Agent, or Firm* — Cantor Colburn LLP

(57) ABSTRACT

A system and method to resolve ambiguity in a radar system involve detecting one or more objects with the radar system. The detecting includes obtaining range, azimuth, and an ambiguous range rate of a first object of the one or more objects. A plurality of Kalman filters are generated with state variables that include parameters based on the range, the azimuth, and the ambiguous range rate. Each of the plurality of Kalman filters provides a different estimate for an unambiguous range rate. The method also includes updating the plurality of Kalman filters using additional detections by the radar system, selecting a selected Kalman filter from among the plurality of Kalman filters that exhibits a highest probability mass among a plurality of probability mass corresponding with and derived from the plurality of Kalman filters, and determining the unambiguous range rate of the object using the selected Kalman filter.

20 Claims, 3 Drawing Sheets

RESOLUTION OF DOPPLER AMBIGUITY IN A RADAR SYSTEM THROUGH TRACKING

INTRODUCTION

The subject disclosure relates to the resolution of Doppler ambiguity in a radar system through tracking.

Sensors (e.g., cameras, radio detection and ranging (radar) systems, light detection and ranging (lidar) systems) are increasingly used to augment or automate the operation of vehicles (e.g., automobiles, trucks, construction equipment, farm equipment, automated factor equipment). A radar system provides azimuth, elevation, and range to the position of an object in its field of view. Based on transmitting a series of signals, the radar system may also provide the relative velocity of the object based on the Doppler effect (i.e., change in frequency of the reflections resulting from the transmissions). In high-speed applications, such as the automobile application, the object being detected by the radar system may travel faster than the maximum unambiguously detectable velocity of the radar system. Accordingly, it is desirable to provide resolution of Doppler ambiguity in a radar system through tracking.

SUMMARY

In one exemplary embodiment, a method of resolving ambiguity in a radar system includes detecting one or more objects with the radar system. The detecting includes obtaining range, azimuth, and an ambiguous range rate of a first object of the one or more objects. A plurality of Kalman filters are generated with state variables that include parameters based on the range, the azimuth, and the ambiguous range rate. Each of the plurality of Kalman filters provides a different estimate for an unambiguous range rate. The method includes updating the plurality of Kalman filters using additional detections by the radar system, selecting a selected Kalman filter from among the plurality of Kalman filters that exhibits a highest probability mass among a plurality of probability mass corresponding with and derived from the plurality of Kalman filters, and determining the unambiguous range rate of the object using the selected Kalman filter.

In addition to one or more of the features described herein, the generating the plurality of Kalman filters, the selecting the selected Kalman filter, and the determining the unambiguous range rate of the object using the selected Kalman filter is performed iteratively for the first object of the one or more objects as long as the first object is among the one or more objects detected with the radar system.

In addition to one or more of the features described herein, the generating the plurality of Kalman filters includes generating an N×M matrix of Kalman filters for every iteration after a first iteration.

In addition to one or more of the features described herein, the generating the N×M matrix of Kalman filters includes generating M Kalman filters, wherein M is a number of hypotheses of interest, from N states, wherein the N states correspond with N Kalman filters among the plurality of Kalman filters in a previous iteration with highest probability mass among the plurality of probability mass corresponding with and derived from the plurality of Kalman filters.

In addition to one or more of the features described herein, each of the number of hypotheses of interest corresponds with an integer multiple of the ambiguous range rate.

In addition to one or more of the features described herein, the generating the plurality of the Kalman filters includes generating the state variables to include parameters based on a combination of the range and the azimuth.

In addition to one or more of the features described herein, the generating the state variables with parameters based on the combination of the range and the azimuth includes determining a lateral distance from the first object and a longitudinal distance from the first object.

In addition to one or more of the features described herein, the generating the plurality of the Kalman filters includes generating the state variables to include lateral velocity and longitudinal velocity based on the ambiguous range rate.

In addition to one or more of the features described herein, the detecting includes obtaining range, azimuth, and an ambiguous range rate of a second object of the one or more objects.

In addition to one or more of the features described herein, the method also includes generating a second plurality of Kalman filters with state variables that include parameters based on the range, the azimuth, and the ambiguous range rate. Each of the second plurality of Kalman filters provides a different estimate for an unambiguous range rate.

In another exemplary embodiment, a system to resolve ambiguity in a radar system includes a memory device to store detection information for one or more objects. The detection information includes range, azimuth, and an ambiguous range rate of a first object of the one or more objects. The system also includes a processor to generate a plurality of Kalman filters with state variables that include parameters based on the range, the azimuth, and the ambiguous range rate. Each of the plurality of Kalman filters provides a different estimate for an unambiguous range rate, to update the plurality of Kalman filters using additional detections by the radar system, to select a selected Kalman filter from among the plurality of Kalman filters that exhibits a highest probability mass among a plurality of probability mass corresponding with and derived from the plurality of Kalman filters, and to determine the unambiguous range rate of the object using the selected Kalman filter.

In addition to one or more of the features described herein, the processor generates the plurality of Kalman filters, to select the selected Kalman filter, and determines the unambiguous range rate of the object using the selected Kalman filter iteratively for the first object of the one or more objects as long as the first object is among the one or more objects detected with the radar system.

In addition to one or more of the features described herein, the plurality of Kalman filters includes an N×M matrix of Kalman filters for every iteration after a first iteration.

In addition to one or more of the features described herein, in the N×M matrix of Kalman filters, M is a number of hypotheses of interest, from N states, wherein the N states correspond with N Kalman filters among the plurality of Kalman filters in a previous iteration with highest probability mass among the plurality of probability mass corresponding with and derived from the plurality of Kalman filters In addition to one or more of the features described herein, each of the number of hypotheses of interest corresponds with an integer multiple of the ambiguous range rate.

In addition to one or more of the features described herein, the state variables include parameters based on a combination of the range and the azimuth.

In addition to one or more of the features described herein, the parameters based on the combination of the range and the azimuth include a lateral distance from the first object and a longitudinal distance from the first object.

In addition to one or more of the features described herein, the state variables include lateral velocity and longitudinal velocity based on the ambiguous range rate.

In addition to one or more of the features described herein, the detection information includes range, azimuth, and an ambiguous range rate of a second object of the one or more objects. The processor also generates a second plurality of Kalman filters with state variables that include parameters based on the range, the azimuth, and the ambiguous range rate. Each of the second plurality of Kalman filters provides a different estimate for an unambiguous range rate.

In addition to one or more of the features described herein, the system is part of a vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
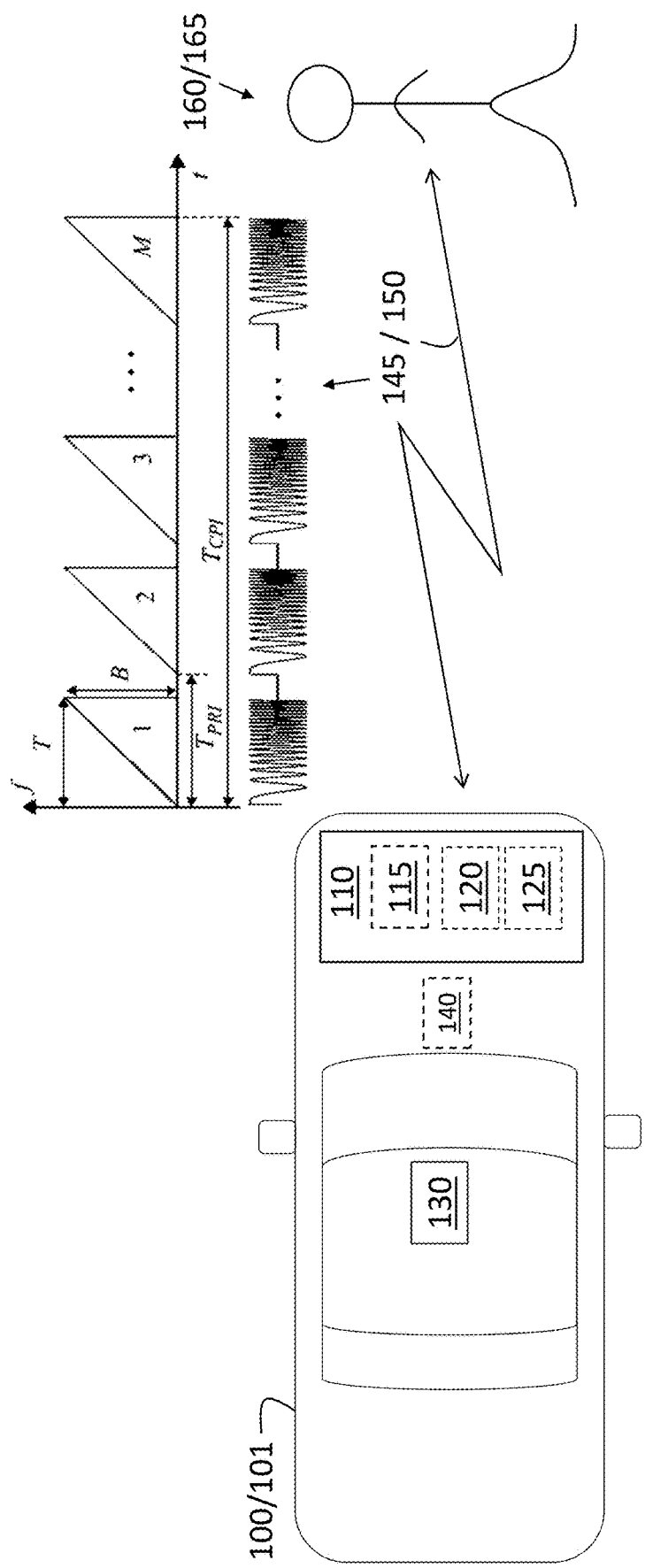
FIG. 1 is a block diagram of a vehicle that resolves Doppler ambiguity in a radar system through tracking.

The following description is merely exemplary in nature and is not intended to limit the present disclosure, its application or uses. It should be understood that throughout the drawings, corresponding reference numerals indicate like or corresponding parts and features.

As previously noted, the relative velocity (i.e., range rate) of an object in the field of view of the radar system can exceed the maximum unambiguously detectable velocity. The maximum unambiguously detectable velocity is a function of the pulse repetition interval (PRI). The radar system may transmit any waveform such as, for example, a frequency modulated signal such as a linear frequency modulated continuous wave (LFMCW), known as a chirp. In this exemplary case, the PRI is the interval from the start of a chirp to the start of the next chirp. The maximum unambiguously detectable velocity is inversely proportional to the PRI. Ambiguity means that, for example, when the maximum unambiguously detectable velocity is 20 miles per hour (mph), an object with a relative velocity of 30 mph can also look like it is moving at 10 mph.

Embodiments detailed herein relate to resolution of Doppler ambiguity through tracking in a radar system. Specifically, Kalman filters, which are recursive estimators, are generated with state variables based on detected azimuth, range, and range rate. The highest probability mass among those associated with the Kalman filters is identified to estimate the range rate of the object. That is, the position (indicated by azimuth and range) of an object and the range rate of an object must correspond. For example, an object with a relatively higher range rate away from the radar system will have a relatively farther position from the radar system from one observation to the next. Because the position obtained by the radar system is not ambiguous but the range rate is, estimating position and range rate with the Kalman filters facilitates selecting the Kalman filter that best matches the position of the object as indicated by the radar system. This Kalman filter may then be used to estimate the unambiguous range rate.

In accordance with an exemplary embodiment, FIG. 1 is a block diagram of a vehicle 100 that resolves Doppler ambiguity in a radar system 110 through tracking. The vehicle 100 shown in FIG. 1 is an automobile 101. The exemplary vehicle 100 includes a radar system 110 and may include one or more other sensors 130 (e.g., camera, lidar system). The radar system 110 includes one or more transmit elements 115, one or more receive elements 120, and a radar controller 125 that may generate the transmit signals 145 and process reflections 150 received due to reflection of the transmit signals 145 by one or more objects 160.

The exemplary object 160 shown in FIG. 1 is a pedestrian 165. According to alternate embodiments, the transmit element 115 and receive element 120 may be the same in a transceiver arrangement. The exemplary transmit signals 145 are chirps 1 through M shown with time t along one axis and frequency f along a perpendicular axis. The height of the chirp (i.e., the frequency difference over the chirp interval) is B. The time-domain signals (i.e., time t versus amplitude) are shown below. The period T of a chirp and the pulse repetition interval period $T_{PRI}$ are indicated, as is the coherent processing interval period $T_{CPI}$.

The vehicle may also include one or more vehicle controllers 140 (e.g., electronic control units (ECUs)). The vehicle controller 140 may process data from the sensors (radar system 110, other sensors 130). In addition, the vehicle controller 140 may perform autonomous driving or control various aspects of the operation of the vehicle 100 (e.g., braking, steering). While exemplary locations are indicated in FIG. 1 for the radar system 110, sensors 130, and vehicle controller 140, those components may be located elsewhere in or on the vehicle 100 according to alternate embodiments.

The functionality detailed herein to resolve Doppler ambiguity may be performed by the radar controller 125, the vehicle controller 140, or both. Both the radar controller 125 and the vehicle controller 140 may include processing circuitry and other components. The processing circuitry may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
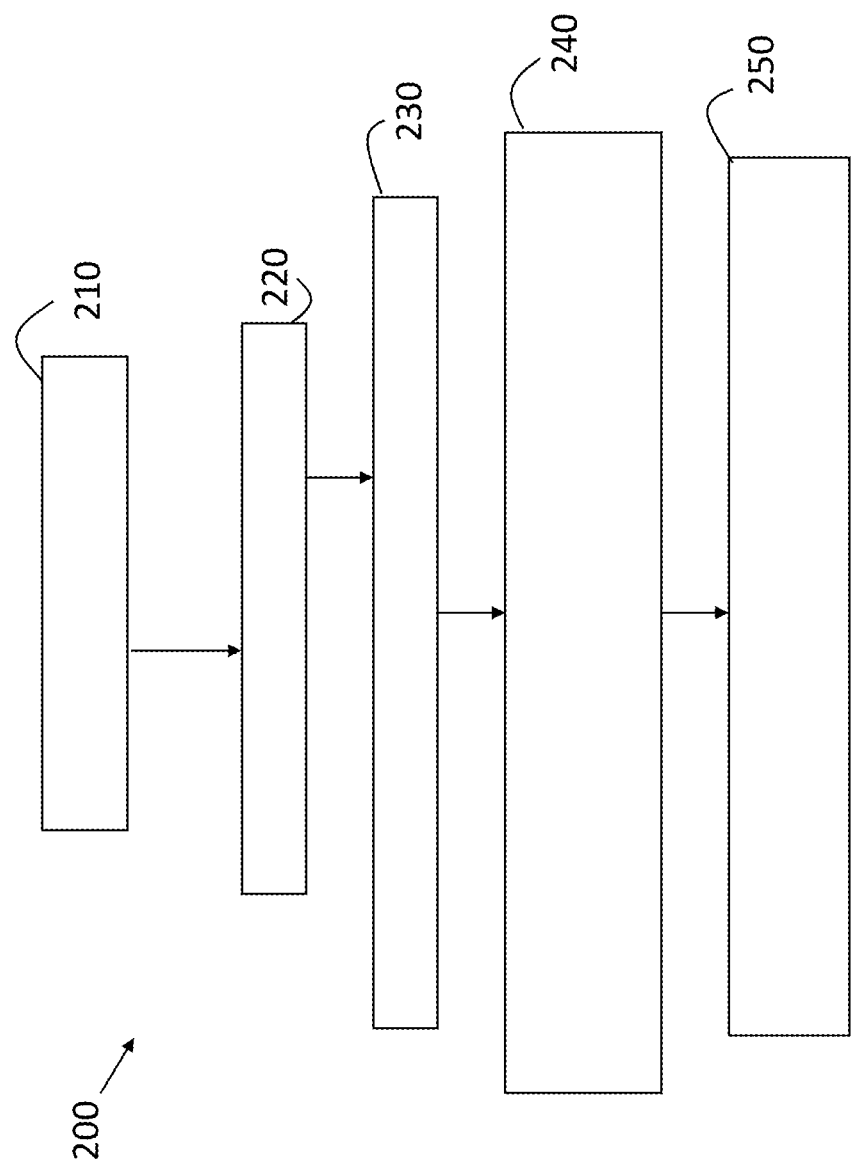
FIG. 2 is a process flow of a method of resolving Doppler ambiguity in a radar system through tracking according to one or more embodiments.

FIG. 2 is a process flow 200 of a method of resolving Doppler ambiguity in a radar system 110 through tracking according to one or more embodiments. At block 210, detecting one or more objects 160 with the radar system 110 includes emitting transmit signals 145 and processing reflections 150 to obtain azimuth, elevation, range, and an ambiguous range rate for each of the objects. These outputs of the detection are further discussed with reference to FIG. 3. The detection processing itself is not changed from conventional detection schemes. The processes at blocks 220 through 250 are then performed for each detected object 160, iteratively, until the object 160 is no longer detected.

At block 220, the process flow 200 includes generating M or N×M Kalman filters. In the first iteration for a given detected object 160, M Kalman filters are generated for M hypotheses of the range rate. In subsequent iterations, the N results with the highest probability mass (determined at block 240) are used to generate M Kalman filters, for the M hypotheses, such that N×M Kalman filters are generated for every iteration except the first. Each of the M hypotheses is an integer multiple of the measured range rate. The value of N may be selected based on the number of scenarios to be considered and may be, but need not be, the same value as M. The value of N may be calibrated for a given driving scenario and maximum unambiguous range. For example, a higher N may be used at higher speeds than at lower speeds of the vehicle 100. The state variables for each of the Kalman filters include variables pertaining to position tracking (for which there is no ambiguity) and variables pertaining to range rate (for which there is ambiguity). Thus, the measured position tracking variables facilitate the updated estimates (at block 230) by each of the Kalman filters and the selection (at block 240) of Kalman filters (i.e., the associated hypotheses) that most-closely match the measured position tracking. In this way, the position tracking is used to resolve Doppler ambiguity according to one or more embodiments.

At block 230, updating all of the N×M Kalman filters (or M Kalman filters in the first iteration) based on the next time-step measurements refers to updating the state variables based on subsequent detections of the radar system 110. The conventional equations pertaining to the Kalman filters are not detailed. The relevant aspect of the Kalman filters and the basis for an improvement in resolution of Doppler ambiguity, according to one or more embodiments, is based on the state variables including the (unambiguous) position tracking variables. At block 240, the process flow 200 includes reducing the set of N×M Kalman filters (or M Kalman filters in the first iteration) to the N Kalman filters with the highest probability mass. The probability mass if further detailed. The Kalman filter among the N Kalman filters with the highest probability mass is then selected. At block 250, the range rate is estimated (i.e., the ambiguity is resolved) by using the range rate prediction corresponding with the selected Kalman filter. This range rate estimate may be provided for use by other vehicle systems (e.g., collision avoidance system, sensor fusion module, perception system, automatic braking, automated driving).

In the next iteration, the N Kalman filters with the highest probability mass (at block 240) are each used with the M hypotheses to generate N sets of M (i.e., N×M) Kalman filters. That is, N state variable values, corresponding with the N Kalman filters, are each used to generate M Kalman filters. Once again, at block 250, the range rate estimate of the Kalman filter with the highest probability mass is provided for use by other vehicle systems. This iterative process continues, for each detected object 160, until the object 160 is no longer detected by the radar system 110.

Figure 3:
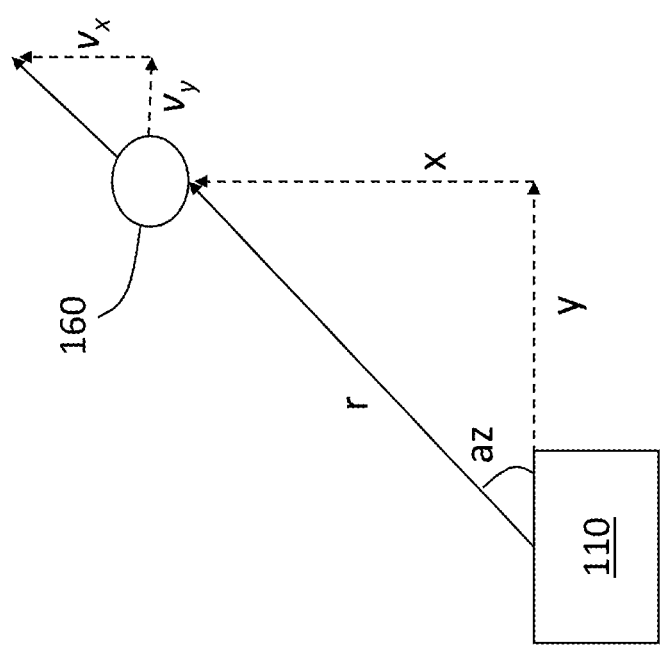
FIG. 3 illustrates a detected object whose Doppler ambiguity is resolved in the radar system according to one or more embodiments.

FIG. 3 illustrates a detected object 160 whose Doppler ambiguity is resolved in the radar system 110 according to one or more embodiments. The range r and azimuth angle az to the object 160 are used to determine the lateral distance y and longitudinal distance x to the object 160. These are the position tracking variables that are included in the state variables of the Kalman filters. The lateral velocity $v_y$ and longitudinal velocity $v_x$ are also indicated. These are the range rate variables that are also included in the state variables of the Kalman filter. The ambiguity in these range rate variables (i.e., the Doppler ambiguity) is resolved based on the processes discussed with reference to FIG. 2.

The Kalman filter equation is given by:

$$[x_{t|0:t}, V_{t|0:t}, L_t] = KF(x_{t-1|0:t-1}, V_{t-1|0:t-1}, y_t, F_t, H_t, Q_t, R_t) \quad [\text{EQ. 1}]$$

In EQ. 1, x is the state variable, V is the error covariance matrix, and L is the likelihood matrix. In addition, y is the observation noise. Specifically, $$x_{t|0:t}^{(ij)} = E\{x_t | n_t = i, m_t = j, y_{0:t}\} \quad [\text{EQ. 2}]$$

$$V_{t|0:t}^{(ij)} = \text{Cov}\{x_t | n_t = i, m_t = j, y_{0:t}\} \quad [\text{EQ. 3}]$$

$$L_{t|0:t-1}^{(ij)} = Pr(y_t | y_{0:t-1}, n_t = i, m_t = j) \quad [\text{EQ. 4}]$$

In EQS. 2-4, E is the expectation operator, Cov is the covariance operator, and Pr is the probability function.

The Kalman filter function KF involves a set of known computations that are not detailed here. Also not detailed are the known state transition model $F_t$, observation model $H_t$, covariance of process noise $Q_t$, and covariance of observation noise $R_t$ that are part of the Kalman filter function. The relevant aspect of each Kalman filter (of the N×M Kalman filters) according to one or more embodiments, is that the state variable x is given by:

$$x = (x, y, v_x, v_y)^T \quad [\text{EQ. 5}]$$

The probability matrix ω for i from 1 to N and j from 1 to M, is given by:

$$\omega_{t|0:t}^{(i,j)} = Pr(n_t = i, m_t = j | y_{0:t}) = \frac{\pi_{t-1|0:t-1}^{(i)} L_t^{(ij)}}{\sum_i \sum_j \pi_{t-1|0:t-1}^{(i)} L_t^{(ij)}} \quad [\text{EQ. 6}]$$

The selection at block 240 (FIG. 2) involves the Select function:

$$[\{x_{t|0:t}^{(i)}, V_{t|0:t}^{(i)}, \pi_{t|0:t}^{(i)} | 1 \leq i \leq N\}] = \text{Select}(\{x_{t|0:t}^{(ij)}, V_{t|0:t}^{(ij)}, w_{t|0:t}^{(ij)} | 1 \leq i \leq N \wedge 1 \leq j \leq M\}) \quad [\text{EQ. 7}]$$

The probability mass is given by:

$$\pi_{t|0:t}^j = \frac{w_{t|0:t}^j}{\sum_i w_{t|0:t}^j} \quad [\text{EQ. 8}]$$

From the highest N probability mass values, the highest is selected, at block 240. The Kalman filter associated with the selected i (i.e., the selected hypothesis corresponding to a particular integer multiple) is the one that provides the unambiguous Doppler (at block 250, FIG. 2).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of resolving ambiguity in a radar system, the method comprising:
   detecting one or more objects with the radar system, wherein the detecting includes obtaining range, azimuth, and an ambiguous range rate of a first object of the one or more objects;
   generating, using a processor, a plurality of Kalman filters with state variables that include parameters based on the range, the azimuth, and the ambiguous range rate, wherein each of the plurality of Kalman filters provides a different estimate for an unambiguous range rate;

updating, using the processor, the plurality of Kalman filters using additional detections by the radar system;

selecting, using the processor, a selected Kalman filter from among the plurality of Kalman filters that exhibits a highest probability mass among a plurality of probability mass corresponding with and derived from the plurality of Kalman filters; and determining, using the processor, the unambiguous range rate of the object using the selected Kalman filter.

2. The method according to claim 1, wherein the generating the plurality of Kalman filters, the selecting the selected Kalman filter, and the determining the unambiguous range rate of the object using the selected Kalman filter is performed iteratively for the first object of the one or more objects as long as the first object is among the one or more objects detected with the radar system.

3. The method according to claim 2, wherein the generating the plurality of Kalman filters includes generating an N×M matrix of Kalman filters for every iteration after a first iteration.

4. The method according to claim 3, wherein the generating the N×M matrix of Kalman filters includes generating M Kalman filters, wherein M is a number of hypotheses of interest, from N states, wherein the N states correspond with N Kalman filters among the plurality of Kalman filters in a previous iteration with highest probability mass among the plurality of probability mass corresponding with and derived from the plurality of Kalman filters.

5. The method according to claim 4, wherein each of the number of hypotheses of interest corresponds with an integer multiple of the ambiguous range rate.

6. The method according to claim 1, wherein the generating the plurality of the Kalman filters includes generating the state variables to include parameters based on a combination of the range and the azimuth.

7. The method according to claim 6, wherein the generating the state variables with parameters based on the combination of the range and the azimuth includes determining a lateral distance from the first object and a longitudinal distance from the first object.

8. The method according to claim 1, wherein the generating the plurality of the Kalman filters includes generating the state variables to include lateral velocity and longitudinal velocity based on the ambiguous range rate.

9. The method according to claim 1, wherein the detecting includes obtaining range, azimuth, and an ambiguous range rate of a second object of the one or more objects.

10. The method according to claim 9, further comprising generating a second plurality of Kalman filters with state variables that include parameters based on the range, the azimuth, and the ambiguous range rate of the second object, wherein each of the second plurality of Kalman filters provides a different estimate for an unambiguous range rate of the second object.

11. A system to resolve ambiguity in a radar system, the system comprising:

a memory device configured to store detection information for one or more objects, wherein the detection information includes range, azimuth, and an ambiguous range rate of a first object of the one or more objects;

a processor configured to generate a plurality of Kalman filters with state variables that include parameters based on the range, the azimuth, and the ambiguous range rate, wherein each of the plurality of Kalman filters provides a different estimate for an unambiguous range rate; and a radar system configured to obtain additional detections by emitting transmit signals and receiving reflections that are processed, wherein the processor is additionally configured to update the plurality of Kalman filters using the additional detections by the radar system, to select a selected Kalman filter from among the plurality of Kalman filters that exhibits a highest probability mass among a plurality of probability mass corresponding with and derived from the plurality of Kalman filters, and to determine the unambiguous range rate of the object using the selected Kalman filter.

12. The system according to claim 11, wherein the processor is configured to generate the plurality of Kalman filters, to select the selected Kalman filter, and to determine the unambiguous range rate of the object using the selected Kalman filter iteratively for the first object of the one or more objects as long as the first object is among the one or more objects detected with the radar system.

13. The system according to claim 12, wherein the plurality of Kalman filters includes an N×M matrix of Kalman filters for every iteration after a first iteration.

14. The system according to claim 13, wherein, in the N×M matrix of Kalman filters, M is a number of hypotheses of interest, from N states, wherein the N states correspond with N Kalman filters among the plurality of Kalman filters in a previous iteration with highest probability mass among the plurality of probability mass corresponding with and derived from the plurality of Kalman filters.

15. The system according to claim 14, wherein each of the number of hypotheses of interest corresponds with an integer multiple of the ambiguous range rate.

16. The system according to claim 11, wherein the state variables include parameters based on a combination of the range and the azimuth.

17. The system according to claim 16, wherein the parameters based on the combination of the range and the azimuth include a lateral distance from the first object and a longitudinal distance from the first object.

18. The system according to claim 11, wherein the state variables include lateral velocity and longitudinal velocity based on the ambiguous range rate.

19. The system according to claim 11, wherein the detection information includes range, azimuth, and an ambiguous range rate of a second object of the one or more objects, and the processor is further configured to generate a second plurality of Kalman filters with state variables that include parameters based on the range, the azimuth, and the ambiguous range rate of the second object, wherein each of the second plurality of Kalman filters provides a different estimate for an unambiguous range rate of the second object.

20. The system according to claim 11, wherein the system is part of a vehicle.

* * * * *